Dec. 24, 1968     D. M. TENNISWOOD     3,417,835
WHEEL TOE CONTROL FOR INDEPENDENT REAR SUSPENSION
Filed Oct. 17, 1966                               2 Sheets-Sheet 1

DAVID M. TENNISWOOD
INVENTOR

BY John R. Faulkner
E. Dennis O'Connor
ATTORNEYS

Dec. 24, 1968      D. M. TENNISWOOD      3,417,835
WHEEL TOE CONTROL FOR INDEPENDENT REAR SUSPENSION
Filed Oct. 17, 1966      2 Sheets-Sheet 2
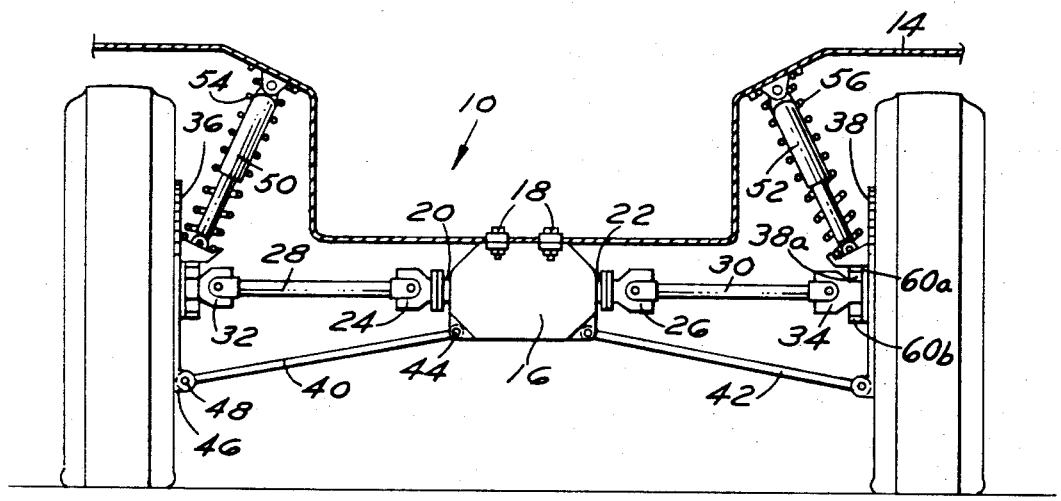
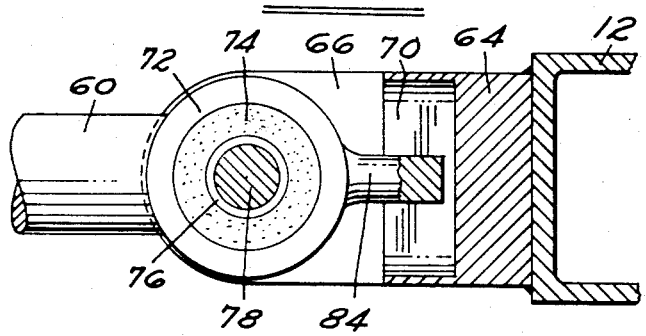
DAVID M. TENNISWOOD
INVENTOR
BY John R. Faulkner
E. Dennis O'Connor
ATTORNEYS – # United States Patent Office 3,417,835
Patented Dec. 24, 1968

3,417,835
WHEEL TOE CONTROL FOR INDEPENDENT REAR SUSPENSION
David M. Tenniswood, Detroit, Mich., assignor to Ford Motor Company, Dearborn, Mich., a corporation of Delaware
Filed Oct. 17, 1966, Ser. No. 587,126
9 Claims. (Cl. 180—73)

ABSTRACT OF THE DISCLOSURE

A wheel toe control for a motor vehicle equipped with an independent rear suspension. Each of the rear wheels of the vehicle is connected to a differential half shaft by means of a universal motion connection. One of a pair of control rods is operatively connected to each of the rear wheels and monitors movement of the vehicle frame in a vertical direction. These control rods adjust the wheel toe of the rear wheels in response to the jounce and rebound movements of the frame relative to the wheels.

---

This invention relates to an independent rear suspension for a motor vehicle, and in particular to an independent rear suspension having a wheel toe control sensitive to relative movement between the rear wheels of the vehicle and the vehicle body-frame assembly.

The current state of the art relating to motor vehicles details the desirability of vehicle suspension design providing for oversteer or understeer, depending on the intended function of the vehicle involved, and occurring when the operator of the vehicle steers the vehicle through an arcuate path, as around a curve. For example, in order to provide a margin of safety and operator convenience, the majority of passenger cars include a suspension that provides understeer when the passenger car is steered through a curve, while it is most common in racing vehicles to provide a suspension that causes oversteer through a curve. Oversteer or understeer is, of course, dictated by the wheel toe of the vehicle as the vehicle passes through an arcuate path, wheel toe being the angle at which a vehicle wheel is oriented relative to the longitudinal axis of the vehicle.

Therefore, an object of this invention is to provide an independent rear suspension whereby vehicle rear wheel toe is positively controlled during the operation of the vehicle.

A further object of this invention is to provide an independent rear suspension for a motor vehicle whereby the toe of the rear wheels of the vehicle will be varied during the operation of said vehicle upon a relative movement between the rear wheels of the vehicle and the vehicle body-frame assembly.

A still further object of this invention is to provide an independent rear suspension that may be modified simply and conveniently to provide either oversteer or understeer.

An independent rear suspension constructed in accordance with this invention is utilized in conjunction with a motor vehicle having a body-frame assembly, a drive shaft, a differential operatively coupled to said drive shaft, a pair of rear wheels and a pair of shaft means, each of said shaft means operatively connecting one of said wheels to said differential. Universal motion joints join said shaft means and said rear wheels. The suspension includes yieldable means interconnecting each of said wheels and said body-frame assembly and a pair of elongate linkage means, each of said linkage means having one end thereof connected to one of said wheels. Coupling means are mounted on the other ends of said linkage means and said body-frame assembly. These coupling means cooperate to join said linkage means to said body-frame assembly and cause the toe of said wheels to vary upon relative movement between said body-frame assembly and said wheels.

Further objects and advantages of this invention will become apparent when the following description is considered in conjunction with the accompanying drawings wherein:

FIGURE 2 is a rear view of the suspension of FIGURE 1 including a portion of the vehicle body-frame assembly in section;

FIGURE 4 is a partial sectional view taken along the line 4—4 of FIGURE 1.

Figure 1:
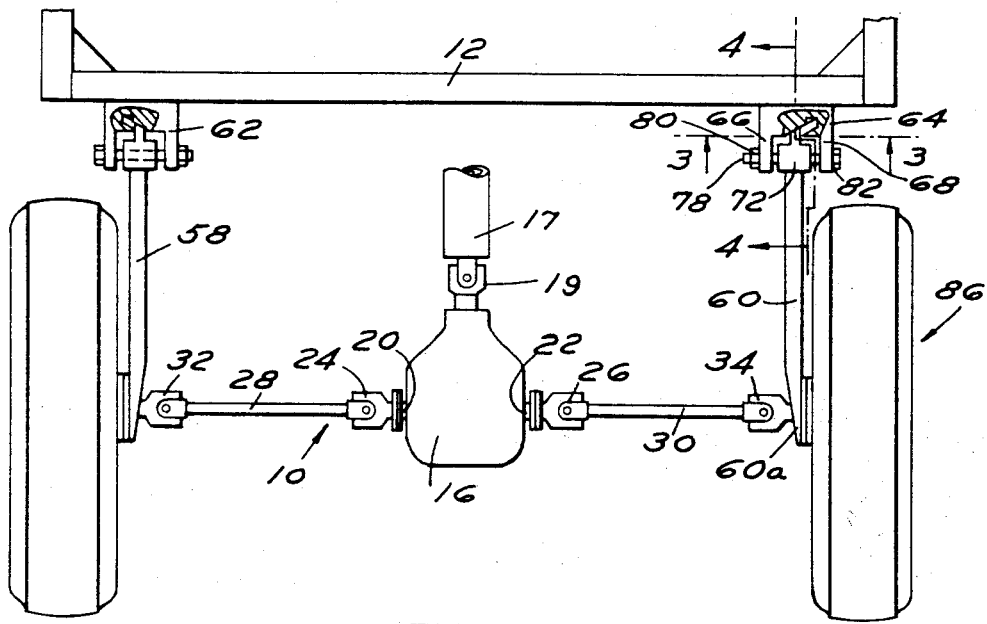
FIGURE 1 is a top view of an independent rear suspension constructed in accordance with this invention having the vehicle body-frame portions removed.

Referring now in detail to the drawings and in particular to FIGURES 1 and 2 there can be seen a rear suspension 10 constructed in accordance with this invention. Suspension 10 is associated with a motor vehicle having a body-frame assembly including frame member 12 and sheet metal body member 14. It is to be understood that the body-frame assembly could also be of the integral, so-called unit body type. A differential 16 is operatively coupled to a drive shaft 17 by a universal joint 19. Fasteners 18 secure differential 16 to body member 14.

Conventional stub shafts 20 and 22 extend from opposite sides of differential 16 and are coupled by means of universal joints 24 and 26 to half shafts 28 and 30, respectively. The universal joints 32 and 34 couple half shafts 28 and 30 to wheels 36 and 38. Control arms 40 and 42 extend from differential 16 to wheels 36 and 38, respectively. Control arm 40 is pivotally secured to differential 16 at 44 and to tab 46, integrally formed on wheel 36, at point 48. Control arm 42 is mounted similar to control arm 40.

Shock absorbers 50 and 52 interconnect body member 14 with wheels 36 and 38, respectively. The shock absorbers are concentric with and surrounded by coil springs 54 and 56 as can be seen in FIGURE 2.

A pair of trailing arms 58 and 60 extend between wheels 36 and 38 respectively and frame member 12. One end of trailing arm 60 is bifurcated into portions 60a and 60b that are located on either side of an extension 38a of wheel 36. A U-shaped housing 64, having legs 66 and 68, is fabricated to frame member 12 and an inclined slot 70 is formed in that portion of housing 64 located between legs 66 and 68. Control arm 60 has an integrally formed enlarged end portion 72 having a central cavity in which is located bushing 74 formed from a resilient material such as rubber. A pin 78 extends through legs 66 and 68 of U-shaped housing 64 as well as enlarged end portion 72 of trailing arm 60 and is secured against movement by fasteners 80 and 82. Pin 78 extends through resilient bushing 74 and is separated therefrom by a sleeve 76. It may thus be seen that trailing arm 60 is pivotally connected to frame member 12 via housing 64.

Figure 3:
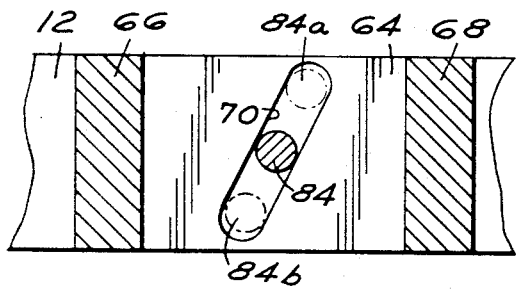
FIGURE 3 is a partial sectional view taken along the line 3—3 of FIGURE 1.

Enlarged end portion 72 of trailing arm 60 has formed thereon an integral pin 84. Pin 84 is oriented such that it extends into slot 70 as best seen in FIGURE 3.

Trailing arm 58 is secured to housing 62, which is identical with housing 64, in the same manner that trailing arm 60 is secured to housing 64 as described above.

Trailing arms 58 and 60 and housings 62 and 64, as well as the structure associated therewith, comprise the wheel toe control of the independent rear suspension illustrated. As described below, the particular suspension illustrated causes oversteer when the vehicle with which it is associated is operated through an arcuate path such as a curve.

If the vehicle associated with the suspension illustrated is steered through a left-hand curve, it is obvious that body member 14 would roll clockwise as viewed in FIGURE 2. Thus wheel 38 would be in jounce (closer to body member 14) and wheel 36 would be in rebound (more remote from body member 14). This rolling motion of the body-frame member that causes the distance between wheel 38 and body member 14 to be lessened dictates that trailing arm 60 pivot about pin 78 in a clockwise direction as viewed in FIGURE 4, and causes pin 84 to approach the position 84b shown in ghost in FIGURE 3. During this movement of pin 84 in slot 70, the walls of slot 70 act as a cam surface and force enlarged end portion 72 of trailing arm 60 to move inboard along pin 78. Since the end of trailing arm 60 remote from enlarged end portion 72 is secured to wheel 38, wheel 38 thus is forced to turn towards the left as indicated by the arrow 86 shown in FIGURE 1.

Although during the left-hand turn described above, wheel 36 is in rebound, it also is forced to turn to the left due to the wheel toe control of this invention inasmuch as the slot formed in housing 62 is similar to slot 70 in that both have their lowest points inboard their highest points. During a right-hand turn of the vehicle, the distance between the body-frame assembly and wheel 38 would become greater. The resulting pivoting of trailing arm 60 about pin 78 whould cause pin 84 to assume the position 84a shown in FIGURE 3. This would cause wheel 38 to turn to the right, or toe out, during a right-hand turn and thus would also result in oversteer. Of course, wheel 36 would also turn to the right, or toe in, during a right-hand turn.

Thus it may be observed that the suspension illustrated is adapted to produce vehicle oversteer resulting in toe out for a wheel in rebound and toe in for a wheel in jounce during the negotiation of a curve. It is apparent that an independent rear suspension constructed in accordance with this invention may utilize housings similar to housings 62 and 64 having slots similar to slots 70 but of an infinite variety of slots. For example, if slot 70 were oriented such that its lowest portion were outboard of its highest portion, and the slot formed in housing 62 were similarly oriented, vehicle understeer rather than oversteer would result, that is, the wheel in rebound would be forced to toe in while the wheel in jounce would be forced to toe out.

This invention thus provides an independent rear suspension having a wheel toe control capable of being easily modified to give an infinite number of vehicle steering characteristics.

I claim:
1. An independent rear suspension for a motor vehicle having a body-frame assembly, a drive shaft, a differential operatively coupled to said drive shaft, a pair of wheels and a pair of shaft means, each of said shaft means operatively connecting one of said wheels to said differential, couplings between said shaft means and said wheels, said couplings comprising universal motion joints; said suspension including yieldable means interconnecting each of said wheels and said assembly, a pair of elongate linkage means, each of said linkage means having one end thereof connected to one of said wheels, and coupling means mounted on the other ends of said linkage means and said assembly cooperating to join said linkage means to said assembly and causing the toe of said wheels to vary upon relative movement between said wheels, said coupling means includes a pair of housings secured to said assembly, said other ends of each of said linkage means pivotally secured to each one of said housings, a pin extending from each of said other ends of each of said linkage means, each of said housings having slots formed therein, each of said pins extending into one of said slots.

2. The combination of claim 1, wherein said differential includes a pair of stub shafts protruding from said differential on opposite sides thereof, said shaft means connected to said stub shafts by universal motion joints, and a pair of control arms, each of said control arms connecting said differential and one of said wheels.

3. The combination of claim 1, wherein said differential is secured to said assembly.

4. The combination of claim 1, wherein said differential includes a pair of driving stub shafts protruding from said differential on opposite sides thereof, said shaft means being connected to said stub shafts by universal motion joints, and a pair of control arms, each of said control arms connecting said differential and one of said wheels.

5. The combination of claim 4, wherein said differential is secured to said assembly.

6. In a motor vehicle having an independent rear suspension: a body-frame assembly, a differential, a pair of shafts the axes of said shafts extending substantially horizontally, one end of each of said shafts secured by universal motion couplings to said differential on opposite sides thereof, a pair of wheels, the other end of ench of said shafts secured to said wheels by universal motion couplings, yieldable means securing said wheels to said assembly, a pair of elongate arms, one end of each of said arms secured to one of said wheels, and means mounted on the other ends of said arms and said assembly varying the toe of said wheels in response to relative movement between said assembly and said wheels, said means include a pair of housings secured to said assembly, each of said housings having a slot inclined to the horizontal formed therein, each of said other ends of said arms having a pin extending therefrom, each of said other ends of said arms pivotally secured to one of said housings so that each of said pins is located in one of said slots and is movable therein along the length of said slots.

7. The combination of claim 6, wherein said arms extend substantially horizontally from said wheels to said assembly.

8. The combination of claim 6, wherein said housings are U-shaped, the legs of said housings extending towards said wheels, each of said arms secured to one of said housings by means of a connecting pin extending through the legs of one of said housings and one of said arms, said slots formed in the portions of said U-shaped housings located between said legs.

9. The combination of claim 8, wherein said differential is secured to said assembly.

References Cited
UNITED STATES PATENTS

| | | | |
|---|---|---|---|
| 3,020,968 | 2/1962 | Sampietro | 180—73 |
| 3,177,965 | 4/1965 | Dews | 180—73 |
| 3,202,237 | 8/1965 | Dreisziger | 180—73 |
| 3,327,803 | 6/1967 | Cote et al. | 180—73 |

A. HARRY LEVY, *Primary Examiner.*